United States Patent Office 3,528,104
Patented Sept. 8, 1970

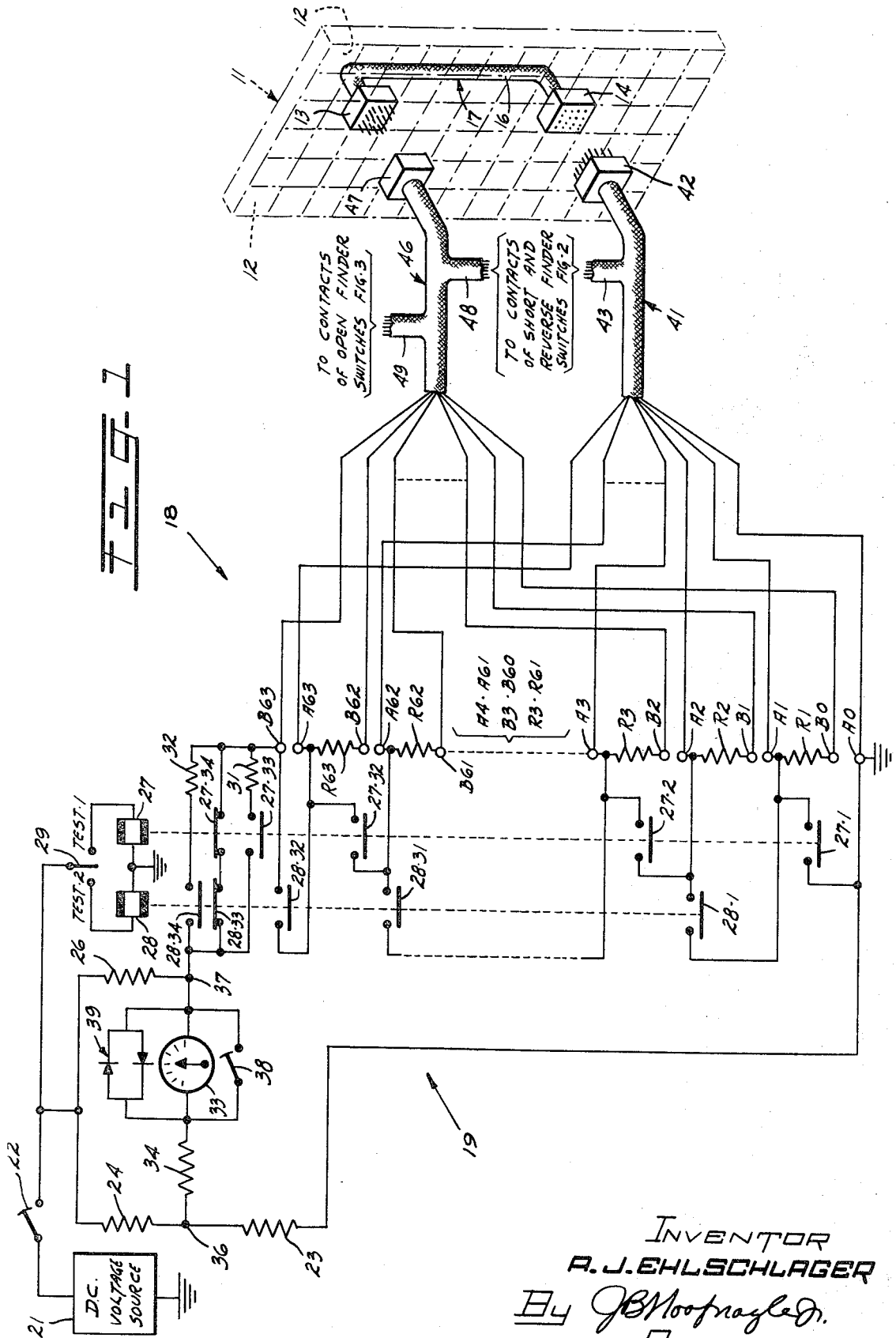

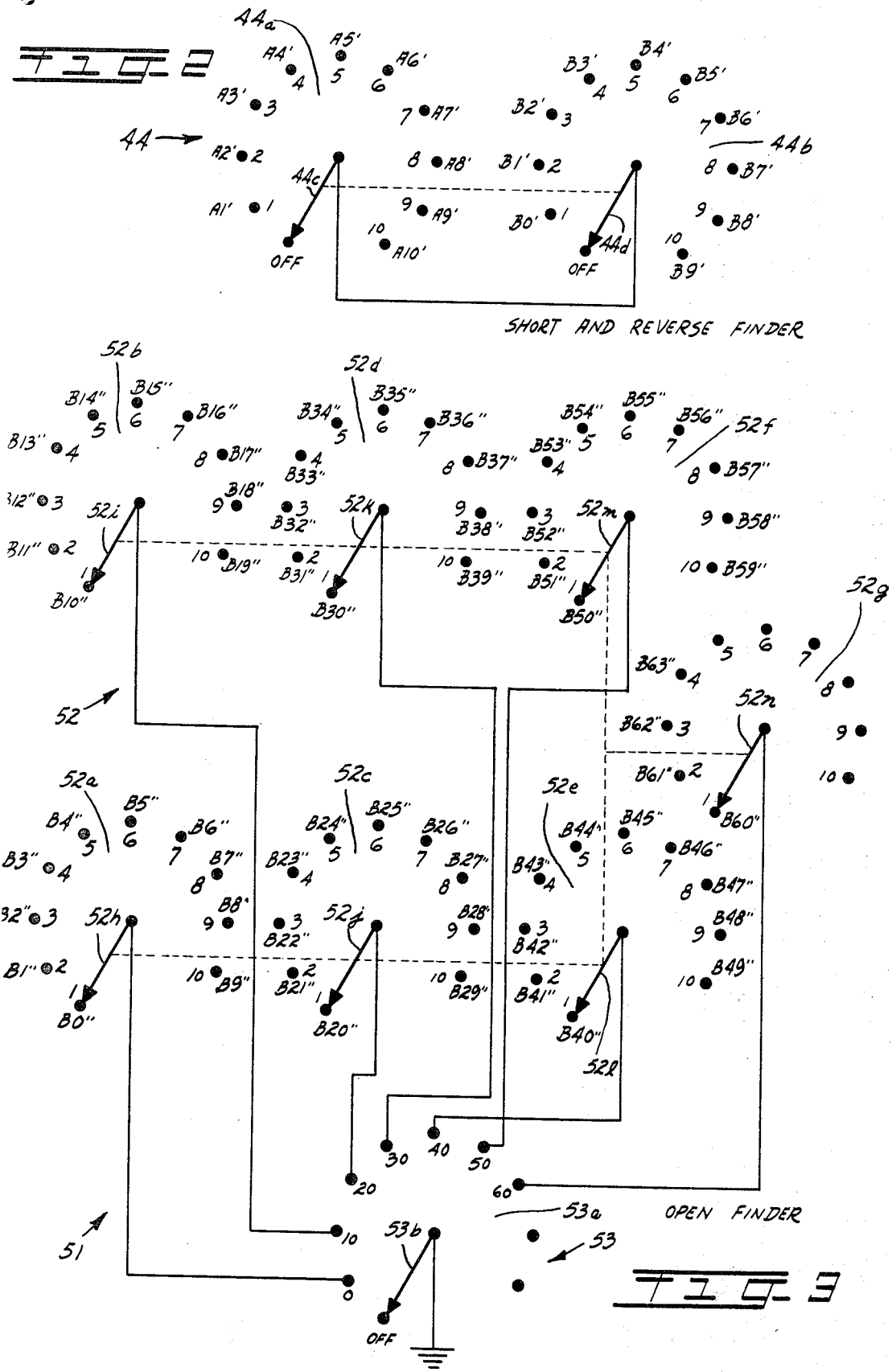

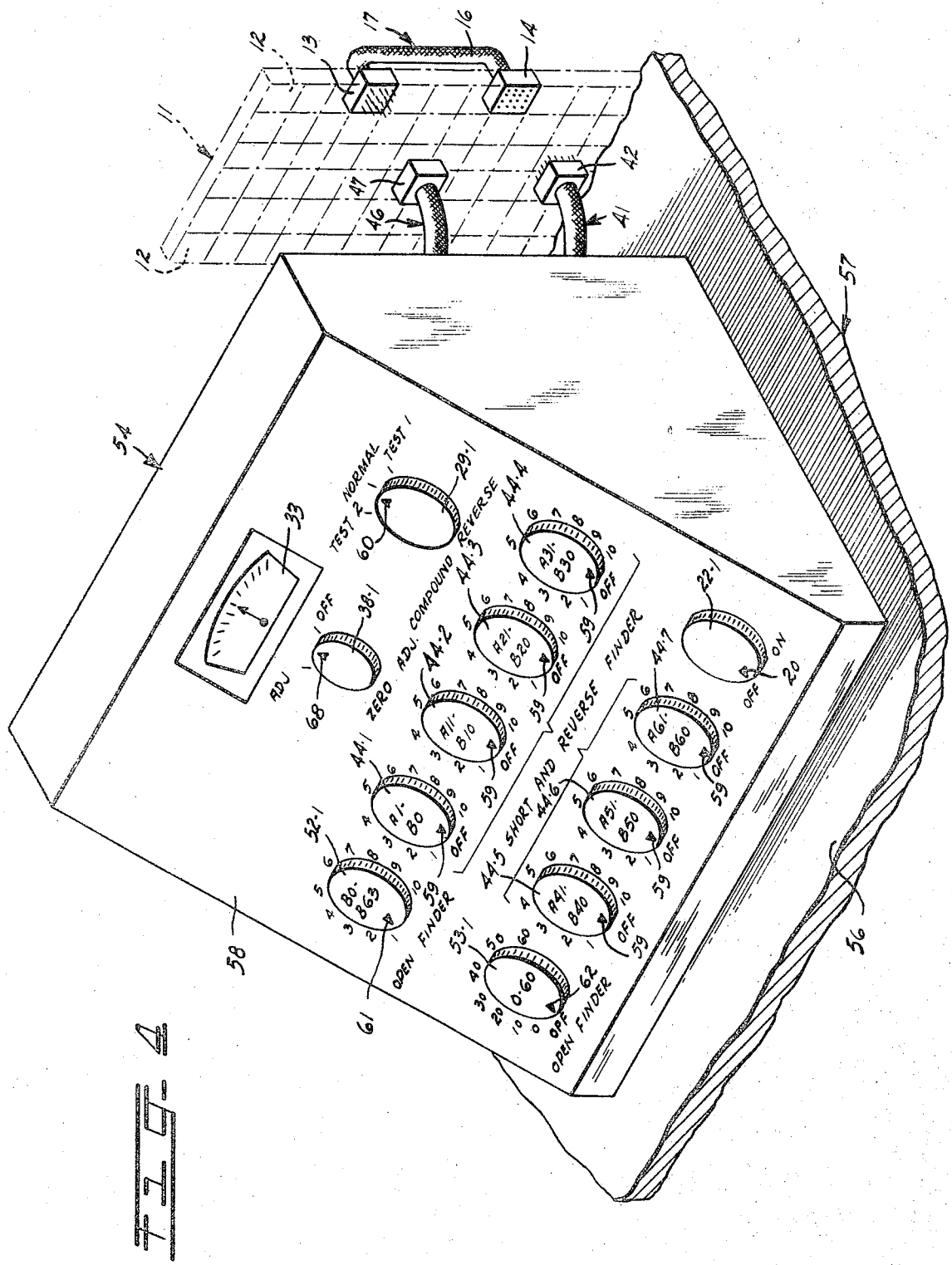

3,528,104
BRIDGE CIRCUIT METHODS OF AND APPARATUS FOR TESTING AND LOCATING FAULTS IN ELECTRICAL CIRCUITS
Arthur J. Ehlschlager, Columbus, Ohio, assignor to Western Electric Company, Incorporated, New York, N.Y., a corporation of New York
Filed Mar. 8, 1968, Ser. No. 711,736
Int. Cl. G01r 31/02
U.S. Cl. 324—51                                   8 Claims

ABSTRACT OF THE DISCLOSURE

Methods of and apparatus for testing electrical circuits to locate faults such as discontinuities, shorts and reverse and bridged connections in the circuits. A Wheatstone type bridge circuit includes three arms having fixed, equal values of resistance therein. A plurality of resistors having a sum total resistance value equal to the resistance value of each of the other three arms of the bridge circuit are arranged to be connected in a fourth arm of the bridge circuit. Conductors of the electrical circuits to be tested are connected in the fourth arm of the bridge circuit so that the plurality of resistors of the fourth arm and the conductors form ideally a series connection with each conductor connected between a pair of associated resistors. The fourth arm of the bridge circuit now has an equivalent single test resistance value which can be compared with the resistance value of at least one of the other three arms of the bridge circuit to determine if the conductors are continuous and that no shorts or reverses are present. If discontinuities, shorts and reverse connections are indicated, switching features are provided for locating the faults.

BACKGROUND OF THE INVENTION

Field of the invention

This invention relates to methods of and apparatus for testing electrical circuits and particularly to methods of and apparatus for testing connected circuits for any faults in and between such circuits and in the connections of the circuits.

Description of the prior art

In the manufacture of certain types of electrical equipment, such as junctor grouping frames used in communications switching offices, a plurality of multiconductor cables are used to interconnect and form wiring circuits between associated pairs of multiterminal plugs and jacks which are mounted in the frame. The plugs and jacks thereafter function as a junction point for incoming and outgoing communications circuits. To insure proper operation of the interconnecting circuits in the field, it is necessary to test the wiring circuits and connections to determine that there are no shorted or open conductors in the cable and that there are no reversed or bridged connections in the circuits.

A common method of testing such circuits is conducted by an operator who selectively connects one side of a battery and buzzer circuit to one contactor of one plug and selectively connects the other side of the battery and buzzer circuit to an associated contactor of an associated jack where the associated contactor should be ideally interconnected by one conductor of the multiconductor cable. If the two associated contactors of the plug and jack are interconnected properly, the buzzer is operated to indicate acceptability of the test. If the buzzer does not operate, an open conductor or faulty circuit connection is indicated. Additionally, each of the remaining contactors of the jack are connected successively to one side of the battery and buzzer circuit while the other side of the battery and buzzer circuit remains connected to the originally selected contactor of the plug. If the buzzer is operated during the latter test, a short, reverse or bridged connection is indicated. In large scale manufacture of the junctor grouping frames, the testing of the circuits of the frame in the described fashion is tedious, time consuming and costly.

In the manufacture of multiconductor cable, tests are conducted to locate faults such as shorts and discontinuities. One method of testing such cables for discontinuities is to connect commonly all of the conductors at a first end of the cable to one side of a power source and a continuity indicator, such as a buzzer, and then connect successively selectively the other side of the continuity indicator to each of the indivdual conductors at a second end. The operation of the buzzer indicates continuity at least between the individually selected ends of the conductors at the second end of the cable and the commonly connected conductors at the first end of the cable. After the continuity test, the conductors are disconnected from the continuity indicator and the conductor ends of the first end of the cable are all connected to ground except for one conductor which is connected to a high potential. The conductor ends at the second end of the cable are unconnected. If a short exists between the conductor which has the high potential applied selectively thereto and any of the remaining conductors, all of which are connected to ground, an alarm is operated to indicate the presence of the short. This pattern is completed until the connected ends of all of the conductors have been connected to the high potential and tested with respect to the remaining conductors which are connected to ground. In large scale manufacture of multiconductor cable, the testing operation of the type described can also be tedious, time consuming and costly.

SUMMARY OF THE INVENTION

It is, therefore, an object of this invention to provide new and improved methods of and apparatus for testing electrical circuits.

Another object of this invention is to provide new and improved methods of and apparatus for testing electrical circuits for predetermined faults in and between the circuits.

Still another object of this invention is to provide new and improved methods of and apparatus for testing electrical circuits for detecting and locating discontinuities, shorts and reverse and bridged connections in the circuits.

A further object of this invention is to provide new and improved methods of an apparatus for testing electrical circuits by connecting simultaneously each circuit of a selected group of circuits into a balancing network and detecting any unbalance in the network as an indication of the presence of discontinuities, shorts and reverse and bridged connections in the selected group of circuits.

An additional object of this invention is to provide new and improved methods of and apparatus for testing a plurality of electrical circuits by using a balancing network to detect simultaneously faults such as discontinuities, shorts and reverse and bridged connections in the circuits and selectively examining each circuit to locate any detected faults.

A method of testing a plurality of electrical circuits illustrating certain features of the invention may include the steps of connecting simultaneously the electrical circuits in a balancing network and detecting any unbalance in the network as a result of faults in and between the circuits being tested.

Apparatus for testing a plurality of electrical circuits illustrating certain features of the invention may include means for connecting simultaneously each of the plurality of electrical circuits into a balancing network and means for detecting any unbalance in the network as a result of faults in and between the circuits being tested.

BRIEF DESCRIPTION OF THE DRAWINGS

Other objects and features of the present invention will be more readily understood from the following detailed description thereof when read in conjunction with accompanying drawings in which:

FIG. 1 is a detailed schematic diagram of a test circuit to be connected with and for the testing of electrical circuits in accordance with the principles of the invention;

FIG. 2 is a detailed schematic diagram of a switching circuit which is connected to the test circuit of FIG. 1 for locating shorts and reverse and bridged connections in electrical circuits;

FIG. 3 is a detailed schematic diagram of a switching circuit which is connected to the test circuit of FIG. 1 for locating discontinuities detected in electrical circuits;

FIG. 4 is a front perspective view of apparatus for testing electrical circuits in accordance with principles of the invention;

DETAILED DESCRIPTION

Figure 5:
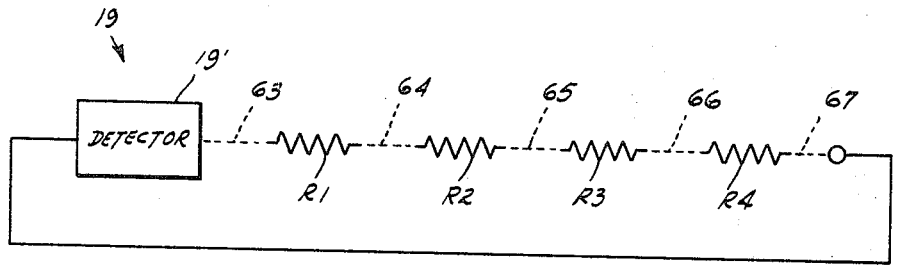
FIG. 5 is a schematic diagram of a representative portion of the circuit shown in FIG. 1 showing an ideal connection for an electrical circuit being tested.

Referring now to FIGS. 1 and 4, a junctor grouping frame, designated generally by the reference numeral 11, is provided with a plurality of compartments 12—12 for supporting pluralities of connector plugs 13—13 (one shown) and connector jacks 14—14 (one shown). An example of the junctor grouping frame 11 is disclosed in "The Bell System Technical Journal," vol. XLIII, No. 5, Pt. 2, September 1964, pp. 2435 through 2438. Selected ones of the plugs 13—13 and the jacks 14—14, which are each provided with a corresponding plurality of contactors, are interconnected by a multiconductor cable 16. Individual conductors (not shown) of the multiconductor cable 16 are connected at opposite ends thereof to associated contactors of the associated plug 13 and jack 14 to form electrical circuits, designated generally by the reference numeral 17. A plurality of such electrical circuits 17—17 are supported on the junctor grouping frame 11.

The junctor grouping frames 11—11 are used in central offices for telephone switching networks and provide a junction for grouping various types of incoming and outgoing circuits. Before the electrical circuits 17—17 are used, it is very important that each of the electrical circuits be tested to insure that there are no discontinuities in the individual conductors or shorts between the conductors of the multiconductor cables 16—16. Further, the electrical circuits 17—17 should be tested to insure that there are no reversed connections, such as conductors being connected to the wrong contactors of the associated plugs 13—13 and jacks 14—14, nor shorts between adjacent contactors which may, for example, be bridged by solder used to connect the conductors to associated contactors of the associated plugs and jacks.

Referring further to FIG. 1, a test circuit, designated generally by the reference numeral 18, includes a balance detector network, such as a Wheatstone bridge circuit, designated generally by the reference numeral 19. The test circuit 18 further includes a D.C. voltage source 21, having one side connected to ground, and an on-off switch 22 for facilitating the application of operating potential to the balance detector network 19. The balance detector network 19 includes three resistors 23, 24 and 26 connected in three separate arms of the network.

A plurality of resistors R1 through R63 are positioned physically to be connected into a fourth arm of the balance detector network 19 and are normally disconnected from each other and from the network. A series of termination points A0 through A63 and B0 through B63 are also included in the fourth arm of the balance detector network 19 and provide termination points for associated ones of the resistors R1 through R63. As an example, the resistor R1 is connected between the termination points B0 and A1. It is noted that only a portion of the termination points A0 through A63 and B0 through B63 and the resistors R0 through R63 are shown. The balance detector network 19 is connected to ground at a point between the resistor 23 and the termination point A0 to facilitate the connection of the D.C. voltage source 21 to the network when the switch 22 is closed.

A pair of relay coils 27 and 28, each having one side connected to ground, may have the other sides thereof connected to the D.C. voltage source 21 through the switch 22 and the selective operation of a single-pole, three-position switch 29 to control associated normally-open contacts 27-1 through 27-32 and normally-open contacts 28-1 through 28-32, respectively, for selectively shorting out predetermined portions of the fourth arm of the balance detector network 19 when a test is being conducted to determine whether there are any multiple reverse connections in the electrical circuit 17 being tested. Additionally, the relay coil 27 controls normally-open contact 27-33 and normally-closed contact 27-34 to selectively connect a resistor 31 into the fourth arm of the balance detector network 19 when operating potential is applied to the relay coil 27.

Additionally, the relay coil 28 controls the normally closed contact 28-33 and normally open contact 28-34 to selectively connect a resistor 32 into the fourth arm of the balance detector network 19 when operating potential is applied to the relay coil.

A series combination of a zero-center, current measuring meter 33 and a current limiting resistor 34 are connected between a first junction point 36, which is located between the resistors 23 and 24, and a second junction point 37 which is located between the resistor 26 and the normally closed contact 28-33. A shorting switch 38 is connected in parallel with the meter 33 to short the meter during a period when the needle of the meter is being mechanically adjusted centrally to a zero reading. A varistor, designated generally by the reference numeral 39, which is a nonlinear device, is connected in parallel with the meter 33 and presents a high impedance to low values of current but decreases in impedance as the values of current increase. Thus, normally low values of current which are developed by the balance detector network 19 in response to an unbalance in the network are directed through the meter 33 which functions, in this example, as an unbalance detector. When the values of current exceed the operating range of the meter 33, the impedance of the varistor 39 is sufficiently low to permit the current to flow through the varistor rather than through the meter, thereby protecting the meter.

Each of the termination points A0 through A63 are connected to one end of associated conductors of a multiconductor cable, designated generally by the reference numeral 41. The other end of the conductors of the cable 41 are connected to a plug 42 which is similar to the plug 13 and which mates with the jacks 14—14 of the junctor grouping frame 11. A branch cable 43 extends from the cable 41 and provides conductors having common ends which are also connected to the termination points A1 through A63. The other ends of the conductors of the branch cable 43 are connected to associated contacts of a plurality of switches each of which is identical to a switch, designated generally by the reference numeral 44, and shown in FIG. 2. For example, a first group of ten termination points A1 through A10 of the balance detector network 19 are connected to associated contacts A1' through A10', respectively, of a first contact deck 44a of the switch 44. Six other switches (not shown), which are identical to the switch 44, are provided for connecting the six groups of termination points A11 through A20, A21 through A30, A31 through A40, A41 through A50, A51 through A60 and A61 through A63 to associated contacts of the six other switches (not shown) which associated contacts correspond to A11' through A20', A21' through A30', A31' through A40', A41' through A50', A51' through A60' and A61' through A63', respectively, of the illustrated switch 44.

The termination points B0 through B63 of the balance detector network 19 are connected to one end of associated conductors of a multiconductor cable, designated generally by the reference numeral 46. The other ends of the conductors of the cable 46 are connected to a jack 47 which is similar to the jack 14 and which mates with the plugs 13—13 of the junctor group frame 11.

A first branch cable 48 extends from the cable 46 and is provided with conductors, common ends of which are connected to the termination points B0 through B62 of the balance detecting network 19. The other ends of the conductors of the branch cable 48 are connected to associated contacts of the plurality of switches which are identical to the illustrated switch 44 (FIG. 2) For example, a first group of the termination points B0 through B9 of the balance detector network 19 are connected to a corresponding group of associated contacts B0' through B9', respectively, of a second contact deck 44b of the switch 44. Six other groups of termination points B10 through B19, B20 through B29, B30 through B39, B40 through B49, B50 through B59 and B60 through B62, of the balance detector network 19, are connected to associated contacts of the second contact deck of six associated switches (not shown) which are identical to the illustrated switch 44, which associated contacts correspond to B10' through B19', B20' through B29', B30' through B39', B40' through B49', B50' through B59' and B60' through B62' (all not shown), respectively, of the illustrated switch 44.

Referring to FIG. 2, each switch, which is identical to the switch 44, is provided with two contact decks and each deck has eleven contacts and a rotary contactor. For example, the switch 44 has two contact decks 44a and 44b and two rotary contactors 44c and 44d, respectively. Each pair of rotary contactors of each switch, for example, the rotary contactors 44c and 44d of the switch 44, is connected electrically to each other and are linked mechanically so that they may be moved together. The switching arrangement of the switches, which are identical to the illustrated switch 44, are used to locate detected shorts and reversed and bridged connections and is referred to as the "SHORT AND REVERSE FINDER."

Referring to FIG. 1, another branch cable 49 extends from the cable 46 and includes conductors, common ends of which are connected to the termination points B0 through B63 of the balance detector network 19. The other ends of the conductors of the branch cable 49 are connected to associated contacts B0" through B63" of a switching circuit, designated generally by the reference numeral 51 (FIG. 3).

Referring to FIG. 3, the switching circuit 51 includes a switch, designated generally by the reference numeral 52, having seven contact decks 52a through 52g, and further includes a switch, designated generally by the reference numeral 53, having a single contact deck 53a. Each of the contact decks 52a through 52g are provided with ten contacts for facilitating the connection of associated termination points B0 through B63 of the balance detector network 19 thereto. For example, the group of ten termination points B0 through B9 are connected to corresponding, associated contacts B0" through B9", respectively, of the contact deck 52a of the switch 52. Six remaining groups of termination points B10 through B19, B20 through B29, B30 through B39, B40 through B49, B50 through B59 and B60 through B63 are connected to corresponding, associated contacts B10" through B19", B20" through B29", B30" through B39", B40" through B49", B50" through B59" and B60" through B63", respectively, of associated contact decks 52b through 52g, respectively, of the switch 52. Additionally, each of the contact decks 52a through 52g are provided with rotary contactors 52h through 52n, respectively, which are linked mechanically to be rotated together.

The switch 53 is provided with the single contact deck 53a having ten contacts, a first of which is designated "OFF." The next seven contacts of the contact deck 53a of the switch 53 are designated 0, 10, 20, 30, 40, 50 and 60, respectively, while the remaining two contacts are not used. The switch 53 is provided with a rotary contactor 53b which is connected to ground and which is positioned normally in engagement with the "OFF" contact. The remaining designated contacts 0, 10, 20, 30, 40, 50 and 60 are connected to the contactors 52h through 52n, respectively, of the switch 52 to facilitate the selective connecting of ground to the termination points B0 through B63 of the balance detector network 19 during a test period when the test circuit has detected discontinuities and is to be used to locate the discontinuities. The switching circuit 51 is referred to as the "OPEN FINDER."

Referring now to FIG. 4, a cabinet, designated generally by the reference numeral 54, provides a housing for the test circuit 18 (FIG. 1) and the associated switch 44 (FIG. 2) and the switching circuit 51 (FIG. 3). The cabinet 54 is positioned on an upper horizontal surface 56 of a table, designated generally by the reference numeral 57. The junctor grouping frame 11 is positioned adjacent to the table 57 so that the plug 42 can be connected to a selected one of the jacks 14—14 and the jack 47 can be connected to a selected one of the plugs 13—13 in preparation for testing each of the electrical circuits 17—17 each of which includes the selected associated plug 13 and associated jack 14 and the conductors of the multiconductor cable 16 connected therebetween.

The cabinet 54 is provided with a front panel 58 which supports the zero-center current meter 33 for visual display. The panel 58 of the cabinet 54 also supports a plurality of switching knobs which are associated with and provide external control for the various switches of the test circuit 18. A knob 22–1 controls the switch 22 (FIG. 1) and has an arrowhead 20 displayed thereon, which cooperates with markings "ON" and "OFF" on the panel 58, to indicate the position of the switch. A knob 44–1 controls the switch 44 (FIG. 2). Knobs 44–2 through 44–7 are linked to and facilitate the control of the remaining six switches which are identical in circuit arrangement to the switch 44 (FIG. 2), as previously described, and which are connected to associated termination points A11 through A63 and B10 through B62 of the balance detector network 19. For example, the knob 44–2 is linked to an associated switch (not shown) which is provided with a first contact deck having contacts connected to the group of associated termination points A11 through A20 of the balance detector circuit 19 and is further provided with a second contact deck having contacts connected to the group of associated termination points B10 through B19.

Markings are placed on the panel 58 of the cabinet 54 adjacent to the periphery of each of the knob 44–1 through 44–7 to indicate that there are eleven positions for each of the associated switches, such as switch 44 (FIG. 2), with one position designated as "OFF" and the remaining ten positions marked 1 through 10, respectively. Additionally, the contacts A1' through A10' and B0' through B9' of the contact decks 44a and 44b, respectively, of the switch 44 (FIG. 2) have also been marked 1 through 10 to correspond to the markings on the panel 58 of the cabinet 54. Further, each of the knobs 44–1 through 44–7 has an arrowhead 59 to indicate the location of the associated knob, and its associated switch, with respect to the associated markings on the panel 58.

Each of the knobs 44–1 through 44–7 is provided with markings to indicate which of the termination points A1 through A63 and B0 through B62 are connected to contacts of switches controlled by the associated marked knobs. For example, the knob 44–1 is marked A1–B0 to indicate that two groups of ten termination points which begin with A1 and B0, that is, A1 through A10 and B0 through B9, are connected to contacts A1′ through A10′ and B0′ through B9′, respectively, of the first and second contact decks 44a and 44b, respectively, of the switch 44 (FIG. 2). Further markings, such as "SHORT AND REVERSE FINDER," are displayed on the panel 58 of the cabinet 54 adjacent to the knobs 44–1 through 44–7 to indicate that these knobs control the associated switches which are manipulated to locate detected shorts in the conductors of the multiconductor cables 16 and reversed and shorted connections of the electrical circuits 17 being tested.

A knob 52–1 is mounted on the panel 58 of the cabinet 54 and is linked to the switch 52 (FIG. 3) for facilitating the control of the switch. The switch 52 is provided with the seven contact decks 52a through 52g having the rotary contractors 52h through 52n, respectively, which are linked together mechanically for common movement as previously described. Therefore, when the knob 52–1 is rotated, the seven contactors 52h through 52n of the associated contact decks 52a through 52g, respectively, are all rotated simultaneously to position the rotary contactors at one of ten available positions. Markings 1 through 10 are displayed on the panel 58 of the cabinet 54 about the periphery of the knob 52–1 to cooperate with an arrowhead 61 displayed on the knob for indicating the instant position of the knob and the rotary contactors 52h through 52n of the contact decks 52a through 52g, respectively. Additionally, markings B0–B63 are displayed on the knob 52–1 to indicate that this knob is associated with the switch 52 which has contacts B0″ through B63″ connected to the termination points B0 through B63, respectively, of the balance detector circuit 19.

A knob 53–1 is positioned on the panel 58 of the cabinet 54 and is linked to the rotating contactor 53b of the switch 53 (FIG. 3) for facilitating control of the switch 53 to selectively connect ground to the rotating contactors 52h through 52n of the contact decks 52a through 52g, respectively, of the switch 52 as previously described. Markings "OFF," "0," "10," "20," "30," "40," "50" and "60" are displayed on the panel 58 of the cabinet 54 about the periphery of the knob 53–1 to cooperate with an arrowhead 62 displayed on the knob for indicating the instant position of the knob and the associated rotary contactor 53b of the switch 53. A marking "0–60" is displayed on the knob 53–1 to indicate that the knob facilitates the control of the switch 53.

Markings, such as "OPEN FINDER," are displayed on the panel of the cabinet 54 adjacent to the knobs 52–1 and 53–1 to indicate that these knobs control the switches 52 and 53 (FIG. 3) for connecting ground to successive termination points B0 through B63 discontinuities in the electrical circuit 16 being tested have been detected and the test circuit 18 is being used to locate the discontinuities.

A knob 29–1 is also located on the panel 58 of the cabinet 54 and facilitates external control of the switch 29 (FIG. 1) for selectively applying operating potential to the relay coils 27 and 28. Operation of the relay coils 27 and 28 shorts out selected portions of the fourth arm of the balance detector network 19, during a period when tests are being conducted to determine whether multiple, or compound, reverse connections are present in the electrical circuit 17. The switch 29 is normally in a neutral position so that neither of the relay coils 27 and 28 have operating potential applied thereto.

An arrowhead 60 is displayed on the knob 29–1 and three markings, such as "TEST 1," "NORMAL" and "TEST 2" are displayed on the panel 58 of the cabinet 54 adjacent to the knob so that the arrowhead on the knob may be positioned adjacent to one of the three markings to select the desired position for the switch 29. For example, the knob 29–1 is normally positioned so that the arrowhead 60 is aligned with the "NORMAL" marking and the operating potential is not applied to either of the relay coils 27 and 28. When it is desired to conduct a test for compound reverses, the knob 29–1 is moved to the "TEST 1" position so that the switch 29 is connected in the circuit which includes the relay coil 27 to facilitate the application of operating potential to the coil 27. When the knob 29–1 is moved to the "TEST 2" position, the switch 29 is disconnected from the circuit which includes the relay coil 27 and is connected to the circuit which includes the relay coil 28 whereby the operating potential is now applied to the coil 28 and removed from application to the relay coil 27. An additional marking "COMPOUND REVERSE" is displayed on the panel 58 of the cabinet 54 to indicate that the knob 29–1 facilitates the control of switch 29 for the compound reverse tests.

A knob 38–1 is located on the panel 58 of the housing 54 adjacent to the zero-center current meter 33 which is also displayed on the panel. The knob 38–1 facilitates the control of the switch 38 (FIG. 1) for shorting the meter 33 during a period when the movement of the meter is being adjusted to a zero position as described previously. A marking "ZERO ADJ." is displayed on the panel 58 of the cabinet 54 to indicate that the knob 38–1 is used to facilitate control of the switch 38 during the period when the meter 33 is being adjusted for a zero reading. Additional markings "OFF" and "ADJ." are displayed on the panel 58 of the cabinet 54 adjacent to an arrowhead 68 displayed on knob 38–1 to indicate the position of the knob and the associated switch 38. For example, when the arrowhead 68 of the knob 38–1 is aligned with the marking "OFF," the switch 38 is open and the current flow passes through the meter 33. When the arrowhead 68 is aligned with the marking "ADJ.," the switch 38 is closed to short the meter 33 during the adjusting period.

OPERATION

Referring to FIG. 1, each of the electrical circuits 17—17 is provided with the multiconductor cable 16 having sixty-four conductors (not shown) which are connected at opposite ends thereof to the sixty-four associated terminations of the plug 13 and the sixty-four associated terminations of the jack 14. In order to test simultaneously each of the conductors of the multiconductor cable 16, the conductors must be connected in the fourth arm of the balance detector network 19. The termination points A0 through A63 and B0 through B63 are arranged so that the sixty-four conductors of the multiconductor cable 16 are connected in series with the sixty-three resistors R1 through R63 of the fourth arm of the balance detector network 19. For example, a first conductor of the multiconductor cable 16 is connected between the termination points A0 and B0, a second conductor is connected between the termination points A1 and B1. This pattern is continued until the sixty-fourth conductor of the cable 16 is connected between the termination points A63 and B63.

It is noted that each of the conductors of the cable 16 and its associated connections to the associated plug 13 and jack 14 is considered an electrical conductor circuit and, therefore, each of the electrical circuits 17–17 is considered to include a plurality of such electrical conductor circuits.

If each of the conductors of the cable 16 is connected properly to the associated plug 13 and jack 14, the conductors and the resistors R1 through R63 will form a series circuit between the termination points A0 and B63. The termination point B63 is connected normally to the point 37 through the normally closed contacts 27–34 and 28–33. Therefore, the fourth arm of the balance detector network 19 includes the termination points A0 through A63 and B0 through B63, the resistors R1 through R63 and the normally-closed contacts 27–34 and 28–33.

For the purposes of explanation, each of the resistors R1 through R63 have a value of 100 ohms and each of the resistors 23, 24 and 26 have a value of 6300 ohms. After the jack 47 and the plug 42 have been connected to the plug 13 and the jack 14, respectively, of the electrical circuit 17 to be tested, the switch 22 is closed to apply the potential of the D.C. voltage source 21 to the balance detector of the D.C. voltage source 21 to the balance detector network 19. If the electrical circuit 17 is wired properly and there are no discontinuities or shorts in the conductors of the associated cable 16, the balance detector network 19 is balanced with 6300 ohms of resistance in each arm of the network. With the balanced condition, no current flows through the current meter 33 whereby the needle of the meter remains on a zero-center position of the scale thereof. In this instance, the meter 33 functions as a null detector to indicate a balanced condition. Thus, the results of this test indicate the electrical conductor circuits of the electrical circuit 17 are connected properly and have no faults therein or therebetween.

Assuming that the conductor of the multiconductor cable 16 of the electrical circuit 17 being tested, which should be connected between the termination points A1 and B1, is actually connected between A1 and B2, the resistor R2 is shorted out. With the resistor R2 shorted out of the fourth arm of the balance detector network 19, the network becomes unbalanced with a resistance value of 6300 ohms connected in each of the first three arms and a resistance value of 6200 ohms connected in the fourth arm of the network. When the unbalance in the balance detector network 19 occurs due to the shortening of the resistor R2, current flows through the meter 33 causing slight deflection of the needle of the meter in one direction, for example, to the right, as an indication of the unbalance in the network and the presence of the improper connection.

Is is noted that the same unbalance in the balance detector network 19 would result if solder, used in connecting the conductor of the cable 16 to the associated terminations of the plug 13 and the jack 14, bridged the terminations which are associated with the termination points A1 and A2 of the network. The resultant effect is the connecting together of termination points A1 and A2 of the balance detector network 19, which, again, shorts out resistor R2. Also, if the conductor of the cable 16 which is connected to the termination points A1 and B1 is shorted internally of the cable to the conductor which is connected to the termination points A2 and B2, the resistor R2 will be shorted out and the balance detector network 19 will become unbalanced as described previously.

If more than one of the resistors R1 through R63 are shorted out, further unbalance of the balance detector network 19 results and the needle of the meter 33 is deflected further to the right. By controlling the parameters of the test circuit 18, the measured value of current flowing through and indicated on the meter 33 when one or more of the resistors R1 through R63 have been shorted out can be used to indicate the number of resistors that are shorted out.

When the meter 33 indicates that an unbalance is present in the balance detector network 19 due to the shorting out of one or more of the resistors R1 through R63, for example, the resistor R2, an operator moves the knob 44–1 (FIG. 4) from the "OFF" position to the "1" position which connects together the contacts A1' and B0' (FIG. 2) to effectively short out the resistor R1 which is connected between associated termination points A1 and B0. Since the resistor R1 was not previously shorted out, the balance detector network 19 is further unbalanced causing additional deflection to the right of the needle of the meter 33.

If the resistor R1 had been shorted out previously due to a fault in the electrical conductor circuits of the electrical circuit 17, the needle of the meter 33 would not deflect any additional amount when the operator moved the knob 44–1 (FIG. 4) to the "1" position. The lack of movement of the needle of the meter 33 when the resistor R1 is shorted out by movement of the knob 44–1 would indicate that the resistor was already shorted out and would further indicate to the operator that the detected fault, which may be a conductor short or a reversed or bridged connection, or any combination thereof, is located in the area of the connections or conductors of the electrical circuit 17 which are associated with and connected to the termination points A0, A1, B0 and B1.

If the needle of the meter 33 did deflect additionally when the knob 44–1 was moved to the "1" position, the operator would move the knob to the "2" position. Since, as indicated previously, the resistor R2 is shorted out due to a fault in the electrical circuit 17, the needle of the meter 33 does not deflect additionally thereby indicating the location of the fault as described previously.

Since it is possible that several faults of the type that includes shorts between the conductors internally of the cable 16 and reversed and bridged connections may exist in the electrical conductor circuits of the electrical circuit 17, the needle of the meter 33 will be deflected substantially to the right if these faults occur. For example, if all of the resistors R1 through R63 are shorted out, the needle of the meter 33 will be deflected full scale to the right. As the knobs 44–1 through 44–7 (FIG. 4) are moved successively through their associated position "1" through "10," to short out successively the resistors R1 through R63, the needle of the meter 33 will deflect each time a previously unshorted one of the resistors R1 through R63 is shorted out. Each time the needle of the meter 33 does not deflect when the knobs 44–1 through 44–7 are moved through their associated positions, a fault is located and may be recorded by the operator or repaired at the time it is located. Hence, the test circuit 18 is capable of detecting the presence of faults such as shorts between conductors internally of the cable 16 as well as reversed and bridged connections and for also locating the detected faults.

If any of the conductors of the cable 16 of the electrical circuit 17 being tested are discontinuous, the fourth arm of the balance detector network 19 will be an open circuit thereby establishing infinite resistance in the fourth arm. When the fourth arm of the balance detector network 19 is discontinuous, the network becomes unbalanced and current flows through the meter 33 to cause the needle to deflect full scale to the left.

Assuming that a discontinuity exists in the conductor of the cable 16 which is connected between the termination points A1 and B1, the operator starts a procedure to locate the discontinuities by turning the knob 52–1 (FIG. 4) to the "1" position and then turning the knob 53–1 to the "0" position so that ground is connected through the rotary contactors 53b (FIG. 3) of the switch 53 to the rotary contactor 52h and the contact B0" of the switch 52 (FIG. 3). When ground is connected to the contact B0", ground is also connected to the termination point B0 through the branch cable 49 and the cable 46. By connecting ground to the termination point B0, the conductor of the cable 16, which is connected effectively between termination points A0 and B0, is bypassed and, if this conductor had been discontinuous, the connecting of ground to the termination point B0 would have balanced the balance detector network 19. When the balance detector network 19 is balanced, the needle of the meter 33 would return to the zero-center position thereby indicating that the bypassed conductor of the cable 16 is discontinuous.

Since, as previously noted, the conductor of the cable 16, which is connected between the termination points A0 and B0, is not discontinuous, the needle of the meter 33 remains at full scale deflection to the left, after the knob 53–1 (FIG. 4) has been moved to the "0" position. The operator then moves the knob 52–1 (FIG. 4) to the "2" position whereby the rotary contactor 52h (FIG. 3) is moved to engage the contact B1″ so that ground is connected to the associated termination point B1. Since the conductor of the cable 16 which is connected between the termination points A1 and B1 is discontinuous, as noted previously, the connecting of ground to the termination point B1 connects a continuous circuit into the fourth arm of the balance detector network 19 which excludes resistor R1 and the two conductors of the cable which are connected between termination points A0 and B0 and A1 and B1, respectively. Since the resistor R1 is not connected into the fourth arm of the balance detector network 19, the circuit is unbalanced.

The previously detected discontinuity caused the needle of the meter 33 to deflect full scale to the left. When ground is connected to the termination point B1, the balance detector network 19 is still unbalanced, as noted; however, the fourth arm of the network is now connected into the network with the exception of the resistor R1. This unbalance causes the needle of the meter 33 to move to the right of the zero-center position which indicates that the discontinuous conductor is connected between the termination points A1 and B1.

If discontinuities are present in more than one of the conductors of the cable 16 of the electrical circuit 17 being tested, the locating, or open finding, procedure will locate each of the opens. For example, assume that one conductor, which is connected between the termination points A62 and B62, is discontinuous, and another conductor, which is connected between the termination points A1 and B1, is also discontinuous. The operator could manipulate the knobs 52–1 and 53–1 (FIG. 4) to connect ground to termination point B63 and observe full scale deflection to the right of the needle of the meter 33, because all of the resistors R1 through R63 are bypassed. The knob 52–1 would then be moved to connect ground to the termination point B62 whereby the needle of the meter 33 would deflect to the right for a distance slightly less than full scale deflection because the resistor R63 has been added into the fourth arm of the balance detector network 19. The operator would then move the knob 52–1 to connect ground to the termination point B61 whereby the needle of the meter 33 would move full scale deflection to the left because the conductor connected between the termination points A62 and B62 is discontinuous. Thus, the movement of the needle of the meter 33 full scale to the left indicates the location of a first discontinuous conductor. The location of the first discontinuous conductor can be noted by the operator and then repaired or bypassed with wire strapping to provide purposely a continuous conductive path between termination points A62 and B62.

Thereafter, the operator continues to move the knobs 52–1 and 53–1 (FIG. 4) to connect ground, in reverse order, to successive termination points B1 through B61 where, upon each successive movement of the knobs, the needle of the meter 33 remains deflected to the right but moves toward the zero-center position as the resistor R2 through R61 are added to the fourth arm of the balance detector network 19. When the knob 52–1 is next moved to connect ground to the termination point B0, the needle of the meter 33 is deflected to the left for full-scale deflection because the fourth arm of the balance detector circuit 19 is no longer connected into the circuit due to the discontinuous conductor which is connected between the termination points A1 and B1. When the needle of the meter 33 moves full scale to the left, it provides an indication to the operator that a discontinuity has been located and it is associated with the conductor which is connected between the termination points A1 and B1. The operator can note the location of the detected discontinuity and repair it or place a wire strap between the termination points A1 and B1 so that the discontinuity testing can be continued.

Referring to FIGS. 5 through 8, there is shown simplified schematic diagrams of representative portions of the test circuit 18 which include only some of the elements of the test circuit for the purposes of simplicity in describing the operation of the test circuit during the test for multiple reverses.

Referring to FIG. 5, there is shown a simplified schematic diagram which represents a portion of the test circuit 18. A detector 19′ includes portions of the balance detector circuit 19 except for the fourth arm of the circuit which is represented by the four resistors R1 through R4 and five conductors of the cable 16 which interconnect the resistors with each other and to the detector 19′ and which are represented by dashed lines 63 through 67. Ideally, the conductors 63 through 67 of the cable 16 should be connected in the fourth arm of the balance detector network 19, as shown in FIG. 5. Occasionally, the conductors of the cable 16 are connected in the electrical circuit 17 so that undesirable multiple reverse connections are present.

Figure 6:
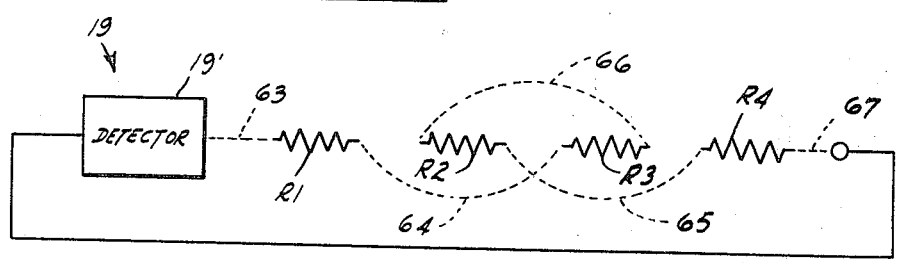
FIG. 6 is a schematic diagram of a representative portion of the circuit shown in FIG. 1 showing undesirable multiple reverse connections in the electrical circuits being tested.

Referring to FIG. 6, there is shown a simplified connection arrangement where the conductors 63 through 67 are not connected properly in the associated electrical circuit 17. However, the conductors 63 through 67 are connected in such a way that the total resistance value of the resistors R1 through R4 would be included in the fourth arm of the balance detector circuit 19 to provide false indication that the conductors are properly connected.

Referring to FIG. 1, the test circuit 18 is provided with the relay coils 27 and 28 and the associated contacts 27–1 through 27–34 and 28–1 through 28–34, respectively, to selectively short out alternate portions of the fourth arm of the balance detector network 19 and, further, to add selectively additional resistors 31 and 32, respectively, into the fourth arm. Each of the resistors 31 and 32 has a resistance value which is equal to the resistance value of the resistors removed selectively from the fourth arm of the balance detector network 19 when the relay coils 27 and 28, respectively, have operating potential applied thereto.

When the operator conducts the tests on the electrical circuit 17 and observes no deflection of the needle of the meter 33, the operator might assume that the circuit passes the tests and is acceptable. However, as noted previously, multiple reverse connections could be present in the electrical circuit 17, for example, as shown in FIG. 6, in such a way that the test circuit 18 would indicate acceptability of the circuit. Therefore, when the operator observes no deflection of the needle of the meter 33, the operator must proceed with the compound reverse test to insure that multiple reverses are not present in the electrical conductor circuits of the electrical circuit 17.

Referring to FIG. 1, when the operator initiates the compound reverse test, the knob 29–1 (FIG. 4) is moved to the "TEST 1" position to close one side of the switch 29 whereby operating potential is applied to the relay coil 27. When operating potential is applied to the relay coil 27, the normally-open, associated contacts 27–1 through 27–32 are closed to short out selected portions of the fourth arm of the balance detector network 19. For example, closure of the contact 27–1 shorts out the portion of the fourth arm of the balance detector network 19 which is connected between the termination points A0 and A1 and which includes the resistor R1. Additionally, when the operating potential is applied to the relay coil 27, the normally-closed, associated contact 27-34 is opened to disconnect the point 37 from direct contact with the termination point B63. The normally-open, associated contact 27-33 is closed to connect the resistor 31 into the fourth arm of the balance detector network 19. The resistance value of the resistor 31 is equal to the total resistance value of the resistors of the fourth arm of the balance detector network which should be removed desirably from the circuit when the contacts 27-1 through 27-32 are closed.

When the selected portions of the fourth arm of the balance detector network 19 are shorted out, the effect of the multiple reverse connections upon the network is usually altered to the extent that an unbalance of the network occurs and is indicated by movement to the right of the needle of the meter 33. However, it is possible that the shorting out of selected portions of the fourth arm of the balance detector network 19 may not alter the effects of the multiple reverse connections and since the resistor 31 has been added to compensate for the removal of the selected resistors, such as the resistor R1 of the selected portions of the fourth arm, the needle of meter 33 will remain in the zero-center position to indicate, incorrectly, that the electrical circuit 17 is properly connected.

The operator thereafter moves the knob 29-1 (FIG. 4) to the "TEST 2" position so that the switch 29 is closed to another side whereby operating potential is removed from the relay coil 27 and applied to the relay coil 28 whereby the relay contacts 27-1 through 27-33 are opened and the relay contact 27-34 is closed. Additionally, when operating potential is applied to the relay coil 28, the normally-open, associated contacts 28-1 through 28-32 are closed to short out selected portions of the fourth arm of the balance detector network 19 which includes all those portions of the fourth arm not previously shorted out when operating potential was applied to the relay coil 27. Further, the normally-closed, associated contact 28-33 is opened to disconnect the direct connection between the point 37 and the termination point B63. The normally-open, associated contact 28-34 is closed to connect the resistor 32 in series with the fourth arm of the balance detector network 19. The resistance value of resistor 32 is equal to the total resistance value of the resistors, such as the resistor R2, which should be shorted out desirably by the closing of the contacts 28-1 through 28-32.

When the contacts 28-1 through 28-32 are closed, the effect of the multiple reverse connections upon the balance detector network 19 will be altered to the extent that an unbalance in the network results and the needle of the meter 33 moves to the right to indicate the unbalance. It is noted that either or both of the compound reverse tests, that is, "TEST 1" and "TEST 2," will provide the necessary indication that multiple reversed connections are present in the electrical conductor circuits of the electrical circuit 17 being tested even though the initial indication was that the circuit was properly connected. It is further noted that if the electrical circuit 17 is connected properly, the addition of the resistances 31 and 32, during successive compound reverse tests, compensates for the selective removal of the resistors of the fourth arm of the balance detector network 19 and will maintain the network in a balanced condition to further provide an indication that the circuit is connected properly.

Figure 7:
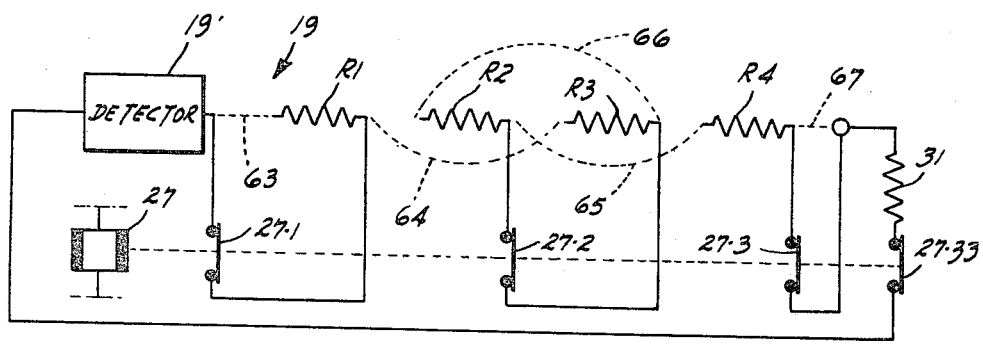
FIGS. 7 and 8 are schematic diagrams of the circuit shown in FIG. 6 showing a procedure for indicating the presence of multiple reverse connections.

Referring to FIG 7, there is shown a schematic diagram of a representative arrangement of the test circuit 19 for the purposes of simplicity in describing further the operation of the test circuit during the tests for detecting multiple reverse connections. Portions of the test circuit 18, which include the relay coil 27 and some of the associated contacts 27-1 through 27-3 and 27-33, are shown to indicate the manner in which the compound reverse tests control the balance detector network 19 and are shown connected into the representative portion of the fourth arm of the balance detector network 19 to short out selected portions of the representative circuit of FIG. 6 wherein multiple reversed connections are apparent. As noted previously, the multiple reversed connections, as shown in FIG 6, are arranged in such a way that no unbalance of the balance detector network 19 will result; and, therefore, there will be no indication of a multiple reverse connection condition.

When the operating potential is applied to the relay coil 27, the normally-open, associated contacts 27-1 through 27-3 are closed and selected portions of the representative fourth arm of the balance detector network 19 are shorted out. Ideally, the resistors R1 and R3 should be shorted out by the closure of the contacts 27-1 and 27-2 if the electrical circuit 17 is connected in the manner shown in FIG. 5. However, due to the multiple reversed connections of the electrical conductor circuits of the electrical circuit 17, which includes the conductors 63 through 67, the resistors R1 and R2 are shorted out and the resistors R3 and R4 remain connected in the fourth arm of the network. The shorting circuit, which includes the contacts 27-1 through 27-3, was designed to short out ideally the two resistors R1 and R3 and to add the resistor 31 to compensate for the removal of these resistors. However, since the resistors R1 through R4 are of equal value, the addition of the resistor 31 into the representative fourth arm of the balance detector network 19 is sufficient to compensate for the actual shorting out of the two resistors R1 and R2. Therefore, the balance detector network 19 continues to indicate that the electrical circuit 17 is properly connected.

Figure 8:
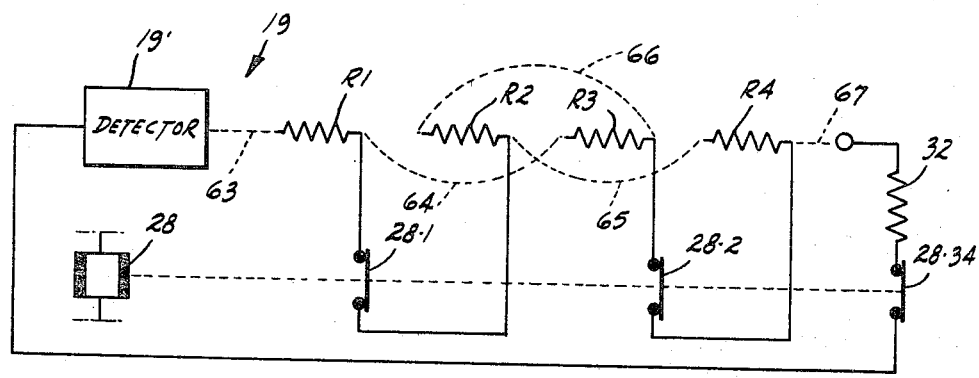

Referring to FIG. 8, the operator then moves the knob 29-1 (FIG. 4) to the position "TEST 2" so that operating potential is removed from the relay coil 27 (FIGS. 1 and 7) and applied to the relay coil 28 whereby the other portions of the representative fourth arm (FIG. 6) of the balance detector network 19 are shorted by the closing of the associated contacts 28-1 and 28-2. For example, if there were no reversed connections in the electrical circuit 17 and the circuit was connected properly as shown in FIG. 5, the closing of the contacts 28-1 and 28-2 would normally short out the two resistors R2 and R4. However, the multiple reversed connections involving representative conductors 64, 65 and 66 are combined with the shorting circuits which include the closed contacts 28-1 and 28-2 to form a series-parallel circuit which includes the three resistors R2, R3 and R4 being connected in parallel with each other and in series with the resistor R1.

Since each of the resistors R1 through R4 are of equal value, the total resistance value of the series-parallel combination of the resistors is equal to one and one-third times the value of each of the resistors. Since the contact 28-34 is closed and the resistor 32, which is twice the value of each of the resistors R1 through R4, is connected into the representative fourth arm of the balance detector network 19, the total resistance in the representative fourth arm is equal to three and one-third times the value of each of the resistors R1 through R4. As noted previously, the representative fourth arm (FIG. 5) of the balance detector network 19 should have the total resistance value of the four resistors R1 through R4 connected therein to balance the network. Since the balance detector network 19, as viewed in FIG. 8, does not have a total resistance value equal to the sum of the resistance values of the four resistors R1 through R4, the network is unbalanced and the needle of the meter 33 is deflected to the right to indicate the presence of multiple reversed connections in the electrical circuit 17 being tested. Once the presence of multiple reversed connections in the electrical circuit 17 have been detected, the operator utilizes the previously described procedure of selectively moving the knobs 44-1 through 44-7 (FIG. 4) to locate each of the reversed connections.

It is to be understood that, while the shorting circuits which are controlled by the relay coils 27 and 28 are sufficient to detect all possible multiple reversed connection conditions for the sixty-four electrical conductor circuits of the electrical circuit 17, as described previously, additional shorting circuits could be added to accommodate electrical circuits having more than sixty-four conductors without departing from the scope of the invention. Additionally, the fourth arm of the balance detector network 19 can be altered and circuit parameters can be changed to accept electrical circuits which have different numbers of conductors with respect to the electrical circuit 17 without departing from the scope of the invention.

The plug 42 and the jack 47 could be modified to facilitate the direct connection of the ends of a cable to be tested for discontinuities in and shorts between conductors of the cable. The tests would be conducted in the manner previously described without departing from the scope of the invention.

It is to be understood that the above-described arrangements are simply illustrative of the invention. Other arrangements may be devised by those skilled in the art which will embody the principles of the invention and fall within the spirit and scope thereof.

What is claimed is:

1. A method for testing a plurality of electrical circuits, which comprises the steps of:

arranging a plurality of impedance elements to be connected normally serially into one arm of a bridge circuit so that the bridge circuit will indicate that the total impedance value of the plurality of impedance elements is within predetermined limits and thus the impedance elements are connected serially therein, interconnecting a plurality of electrical circuits to be tested and the plurality of the impedance elements with each other and to the one arm of the bridge circuit such that the impedance elements and the electrical circuits to be tested are connected in series in a predetermined arrangement in the one arm of the bridge circuit to indicate that the total impedance value of the plurality of impedance elements in the one arm of the bridge circuit is within the predetermined limits, detecting whether the impedance value of the plurality of impedance elements in the one arm of the bridge circuit is within the predetermined limits as an indication that the plurality of electrical circuits are fault free and are connected properly to associated impedance elements and serially in the one arm of the bridge circuit, bypassing electrically separately selected one ones of the plurality of series-connected impedance elements of the one arm of the bridge circuit, and detecting the impedance value of the one arm of the bridge circuit as each selected, series-connected impedance element is bypassed selectively to determine whether the impedance value of the one arm remains unchanged as an indication that at least one of the electrical circuits also bypasses undesirably the selectively bypassed impedance element and is associated therewith.

2. A method for testing a plurality of electrical circuits, which comprises the steps of:

arranging a plurality of impedance elements to be connected normally serially into one arm of a bridge circuit so that the bridge circuit will indicate that the total impedance value of the plurality of impedance elements is within predetermined limits and thus the impedance elements are connected serially therein, interconnecting a plurality of electrical circuits to be tested and the plurality of the impedance elements such that the impedance elements and the electrical circuits to be tested are connected in series in a predetermined arrangement in the one arm of the bridge circuit to indicate that the total impedance value of the plurality of impedance elements in the one arm of the bridge circuit is within the predetermined limits, detecting whether the impedance value of the plurality of impedance elements in the one arm of the bridge circuit is within the predetermined limits as an indication that the plurality of electrical circuits are fault free and are connected properly to associated impedance elements and serially in the one arm of the bridge circuit, connecting selectively serially successive portions of the one arm into the bridge circuit, and detecting the impedance value of the one arm of the bridge circuit as each successive portion of the one arm is connected selectively serially into the bridge circuit to determine whether the impedance value exceeds the total impedance value of the plurality of the impedance elements as an indication that a discontinuous electrical circuit is included in the immediate successive portion of the one arm connected selectively into the bridge circuit.

3. A method for testing a plurality of electrical circuits, which comprises the steps of:

arranging a plurality of impedance elements to be connected normally serially into one arm of a bridge circuit so that the bridge circuit will indicate that the total impedance value of the plurality of impedance elements is within predetermined limits and thus the empedance elements are connected serially therein, interconnecting a plurality of electrical circuits to be tested and the plurality of the impedance elements with each other and to the one arm of the bridge circuit such that the impedance elements and the electrical circuits to be tested are connected in series in a predetermined arrangement in the one arm of the bridge circuit to indicate that the total impedance value of the plurality of impedance elements in the one arm of the bridge circuit is within the predetermined limits.

detecting whether the impedance value of the plurality of impedance elements in the one arm of the bridge circuit is within the predetermined limits as an indication that the plurality of electrical circuits are fault free and are connected properly to associated impedance elements and serially in the one arm of the bridge circuit, bypassing selectively simultaneously a plurality of individual portions of the one arm of the bridge circuit including a selected number of the serially connected impedance elements and electrical circuits being tested, connecting at least one additional impedance element into the one arm of the bridge circuit having an impedance value equal to the impedance value of the serially connected impedance elements included in the individual portions of the one arm which are bypassed selectively simultaneously, and detecting whether the impedance value of the one arm, including the additional impedance element, changes when the plurality of individual portions of the one arm are bypassed selectively simultaneously as an indication that a multiple of the electrical circuits are connected to impedance elements other than the normally associated impedance elements.

4. The method as set forth in claim 3, which includes the steps of:

bypassing electrically separately selected ones of the impedance elements of the one arm of the bridge circuit, and detecting the impedance value of the one arm of the bridge circuit as each impedance element is bypassed selectively to determine whether the impedance value of the one arm changes as an indication that at least one of the multiple of the electrical circuits which is connected to an impedance element other than the normally associated impedance element is connected improperly to the selectively bypassed impedance element.

5. Apparatus for testing a plurality of electrical circuits, which comprises:
   a bridge circuit,
   a plurality of impedance elements arranged to be connected normally serially in one arm of the bridge circuit so that the bridge circuit will indicate that the total impedance value of the plurality of impedance elements is within predetermined limits and thus the impedance elements are connected serially therein,
   means associated with the plurality of impedance elements of the one arm of the bridge circuit for interconnecting a plurality of electrical circuits to be tested and the plurality of the impedance elements with each other and to the one arm of the bridge circuit such that the impedance elements and the electrical circuits to be tested are connected in series in a predetermined arrangement in the one arm of the bridge circuit to indicate that the total impedance value of the plurality of the impedance elements connected serially in the one arm of the bridge circuit is within the predetermined limits,
   means for detecting whether the impedance value of the plurality of impedance elements in the one arm of the bridge circuit is within the predetermined limits as an indication that the electrical circuits are fault free and are connected properly to associated impedance elements and serially in the one arm of the bridge circuit,
   means connectable across each of the series-connected impedance elements of the one arm of the bridge circuit for bypassing electrically separately selected ones of the series-connected impedance elements of the one arm of the bridge circuit so that upon selective bypassing of each of the impedance elements, which is also bypassed undesirably by a faulty electrical circuit, and which thereby connects an impedance value in the one arm lower than the total impedance value of the plurality of the impedance elements arranged to be connected normally serially in the one arm, the lower impedance value of the impedance elements which are connected actually in the one arm remains unchanged to provide an indication that the faulty electrical circuit is associated with the impedance element bypassed, and
   means responsive to the impedance value of the one arm of the bridge circuit established when each of the successive series-connected impedance elements of the one arm is bypassed selectively for indicating the location of faulty electrical circuits associated with each of the successively bypassed impedance elements of the one arm of the bridge circuit.

6. Apparatus for testing a plurality of electrical circuits, which comprises:
   a bridge circuit,
   a plurality of impedance elements arranged to be connected normally serially in one arm of the bridge circuit so that the bridge circuit will indicate that the total impedance value of the plurality of impeance elements is within predetermined limits and thus the impedance elements are connected serially therein,
   means associated with the plurality of the impedance elements of the one arm of the bridge circuit for interconnecting a plurality of electrical circuits to be tested and the plurality of the impedance elements with each other and to the one arm of the bridge circuit such that the impedance elements and the electrical circuits to be tested are connected in series in a predetermined arrangement in the one arm of the bridge circuit to indicate that the total impedance value of the plurality of the series-connected impedance elements in the one arm of the bridge circuit is within the predetermined limits,
   means for detecting whether the impedance value of the plurality of impedance elements in the one arm of the bridge circuit is within the predetermined limits as an indication that the electrical circuits are fault free and are connected properly to associated impedance elements and serially in the one arm of the bridge circuit,
   means connectable selectively to associated portions of the one arm of the bridge circuit for connecting selectively serially successive portions of the one arm into the bridge circuit while bypassing the remaining preceding portions so that when any of the electrical circuits, which are discontinuous, are included in the successive portions connected serially into the one arm of the bridge circuit by the connecting means, the impedance value connected in the one arm exceeds the total impedance value of the plurality of the impedance elements as an indication that the discontinuous electrical circuit is included in the succeeding portion of the one arm connected into the bridge circuit, and
   means responsive to the impedance value of the one arm of the bridge circuit established when each of the successive series-connected portions of the one arm is bypassed selectively for indicating the location of faulty electrical circuits associated with the successively bypassed portions of the one arm of the bridge circuit.

7. Apparatus for testing a plurality of electrical circuits, which comprises:
   a bridge circuit,
   a plurality of impedance elements arranged to be connected normally serially in one arm of the bridge circuit so that the bridge circuit will indicate that the total impedance value of the plurality of impedance elements is within the predetermined limits and thus the impedance elements are connected serially therein,
   means associated with the plurality of impedance elements of the one arm of the bridge circuit for interconnecting a plurality of the impedance elements with each other and to the one arm of the bridge circuit such that the impedance elements and the electrical circuits to be tested are connected in series in a predetermined arrangement in the one arm of bridge circuit to indicate that the total impedance value of the plurality of the the impedance elements in the one arm of the bridge circuit is within the predetermined limits,
   means for detecting whether the impedance value of the plurality of impedance elements in the one arm of the bridge circuit is within the predetermined limits as an indication that the electrical circuits are fault free and are connected properly to associated impedance elements and serially in the one arm of the bridge circuit, and
   means for bypassing selectively simultaneously a plurality of individual portions of the one arm of the bridge circuit including a selected number of the impedance elements and electrical circuits being tested and for connecting into the one arm at least one other additional impedance element having an impedance value equal to the impedance value of the impedance elements included in the bypassed portions of the one arm so that any multiple of the electrical circuits which are connected in the one arm to include serially the plurality of impedance elements and which are connected to impedance elements other than the normally associated impedance elements, are rearranged in the one arm of the bridge circuit to provide a total impedance value including the additional impedance element which is less than the total impedance value of the plurality of impedance elements, the detecting means detecting whether the impedance value of the one arm of the bridge circuit, including the additional impedance element, is the same as the total impedance value of the plurality of the impedance elements as an indication that the electrical circuits are connected properly to associated impedance elements and properly serially in the fourth arm of the bridge circuit.

8. The apparatus as set forth in claim 7 which includes: means connectable across each of associated ones of the impedance elements of the one arm of the bridge circuit for bypassing selectively electrically separately associated ones of the impedance elements of the one arm of the bridge circuit so that when each of the impedance elements is bypassed and the bypassed impedance elements is associated with at least one of the multiple of the electrical circuits connected to impedance elements other than the normally associated impedance elements, the impedance value of the one arm of the bridge circuit is changed as an indication that at least one of the multiple of the electrical circuits is connected improperly to the selectively bypassed impedance element.

References Cited

UNITED STATES PATENTS

| | | | |
|---|---|---|---|
| 2,456,499 | 12/1948 | Fritzinger | 324—54 XR |
| 2,635,135 | 4/1953 | Lamont | 324—52 XR |
| 2,799,013 | 7/1957 | Langer | 324—54 XR |
| 2,822,519 | 2/1958 | Murphy | 324—66 |
| 2,950,437 | 8/1960 | Stahl | 324—51 XR |
| 2,964,701 | 12/1960 | Argabright | 324—66 XR |
| 3,178,639 | 4/1965 | Hillman | 324—51 XR |
| 3,405,357 | 10/1968 | Thompson | 324—51 |

GERARD R. STRECKER, Primary Examiner

U.S. Cl. X.R.

324—62, 73